Dec. 14, 1971  L. D. KURTZ  3,626,517
RUBBER ARTICLES
Filed Nov. 16, 1964
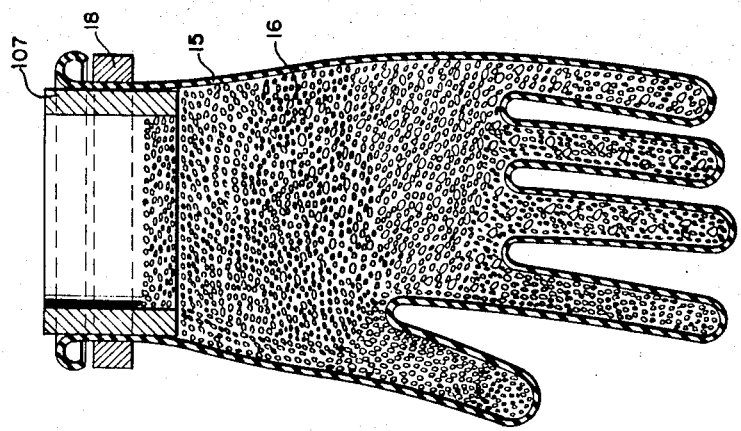
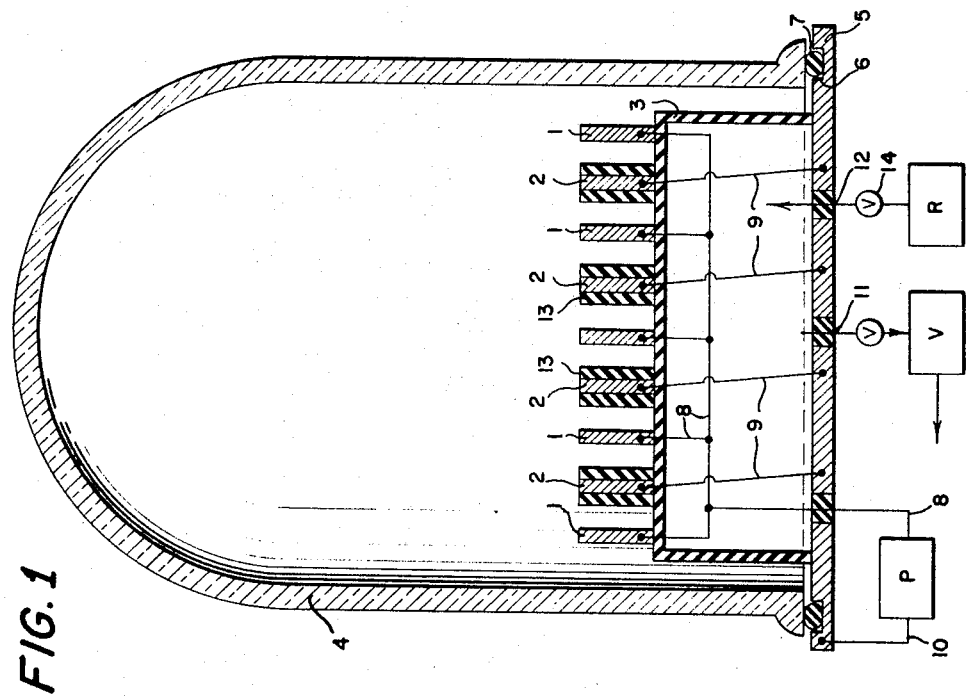
INVENTOR
LEONARD D. KURTZ
BY *Larson and Taylor*
ATTORNEYS

United States Patent Office

3,626,517
Patented Dec. 14, 1971

3,626,517
RUBBER ARTICLES
Leonard D. Kurtz, Woodmere, N.Y., assignor to
Sutures, Inc., Coventry, Conn.
Filed Nov. 16, 1964, Ser. No. 411,334
Int. Cl. A41d 19/00
U.S. Cl. 2—168                                    3 Claims

ABSTRACT OF THE DISCLOSURE

A surgeon's rubber glove having a continuous polytetrafluoroethylene coating over the entire inner, the entire outer or both surfaces.

---

The present invention relates to rubber articles. More particularly, the invention relates to articles in the general configuration of a sheath such as gloves, cots, tubes, etc., and even more particularly relates to medical articles of the foregoing type such as surgeon's gloves, catheters, tracheotomy tubes, etc.

For medical, surgical and other uses, it is frequently required that rubber articles in sheath configuration be lubricated on an inside and/or outside surface for various purposes. For example, surgeon's rubber gloves must be liberally powdered prior to sterilization in order to prevent adjacent rubber surfaces from adhering ("blocking") during or after steam sterilization. Similarly, "blocking" is caused by the mere storage of clean rubber surfaces and can be avoided by the use of starch or talcum lubricant powders.

The surgeon liberally powders his hands before inserting them into the gloves (dry technique) or uses gloves which have been wet with water (wet technique) which provides adequate lubrication for donning the gloves. The surgeon then wipes off the powder lubricant from the outer surface or dries the wet outer surface as the case may be. Powder or wet lubricant, however, remains on the inner surface of the glove and, in the event of a tear or a hole in the glove, the lubricant could be transferred to the body and might cause the formation of granuloma.

Similarly, a jelly lubricant is frequently used on the outer surface of a catheter. This lubricant, however, may be dangerous as, for example, where, on perforation of the bladder, the jelly lubricant enters the blood stream. Other body inserts, such as rubber drains, intravenous tubes, and T-tubes should be easily inserted and removed and should have the least possible adhesion with their lumen or on the outside.

It is an object of the present invention to provide lubricated rubber products. It is a further object of this invention to provide lubricated rubber products which impose no difficulty on the surgeon in his manipulation of instruments or patient. It is a further object of this invention to provide medical and surgical rubber products wherein a surface thereof is provided with an integral lubricant thus eliminating the possibility of transferring lubricant to the body. It is a further object of this invention to provide medical and surgical rubber products to which body fluids and tissues are minimally adherent.

These and other objects are achieved according to the present invention by providing a coating of polytetrafluoroethylene (Teflon) on at least a portion of a surface of a rubber product.

The invention will be more readily understood with reference to the following detailed description which includes a description of the best manner of practicing the invention and the accompanying drawing wherein:

FIG. 1 is a sectional view of apparatus suitable for preparing rubber articles according to the present invention; and FIG. 2 is a sectional view of an alternative electrode arrangement.

The device shown in FIG. 1 is similar in structure and operation to that shown in more detail in U.S. Patent No. 2,932,591, issued Apr. 12, 1960. Electrodes 1 and 2 are positioned on an insulating shelf 3 which is positioned within a bell jar. The bell jar comprises a cover 4 and a base plate 5 provided with a groove 6 and O-ring 7. Power is supplied to electrodes 1 from power supply P through conductor 8 and the electrical circuit is completed by electrodes 2, conductors 9, plate 5, and conductor 10. Vacuum is provided through aperture 11 by a pump V and Teflon monomer vapor is supplied through aperture 12 from a reservoir R. All of the apertures are, of course, sealed in the usual manner with, e.g., a gasket or resin material.

EXAMPLE

The rubber article 13 to be coated was placed on an electrode 2. The article to be coated was tubular as shown in the drawing, and the tubular article 13 was disposed about a tubular electrode. The electrode may be rotated during the process by any convenient means, such as a battery-operated motor, to provide more uniform coating.

Coating was accomplished by evacuating the bell jar to less than 5 mm. Hg absolute. A suitable voltage (300–800 has been found suitable) is supplied to electrodes 1 and 2 from the power supply. The current flow may, of course, vary, but a value of 3 milliamperes per square inch has been found suitable. Teflon monomer vapor is then admitted, through valve 14, from reservoir R to the bell jar. The vapor pressure is allowed to rise to about 5 mm. Hg or until ionization of the vapor occurs as evidenced by the omission of visible light from the plasma of an electrical discharge between the electrodes. The flow of vapor is then controlled by means of valve 14 to maintain the established level of the discharge, replenishing the supply of vapor as it is used up in the formation of polymer films on the electrodes. The atmospheric density of the monomer vapor is suitably 2½ times as dense as air. The rubber article when so treated had an adherent coating of Teflon thereon.

The rubber article shown in the drawing is exemplary of a rubber catheter or tube for medical or surgical uses. Other sheath-like objects, such as condoms and finger-cots could also be placed over tubular electrodes, while relatively complex structures, such as gloves, would require corresponding supports. Furthermore, the coating may be made only partial by masking the article or by utilizing an electrode which is smaller than the article to be coated.

While the invention has utility in respect to many rubber products, gloves provided with Teflon coats in accordance herewith are particularly advantageous. By coating the inside only of the glove (accomplished by turning the glove inside out after coating the outer surface while on the mold) an integral inner coating is provided which prevents adhesion of the adjacent rubber surfaces and which permits easy access within and removal of the gloves while eliminating the possibility of granulomas caused by powdered lubricant. By coating the outside only of the glove, adhesion of outside surfaces is eliminated together with the need to lubricate prior to sterilization and the need to remove such lubricant prior to use.

While the Teflon coating according to this invention has been described as being a lubricant, it has been found, contrary to expectations, that the Teflon coating on the outside of the glove does not in any way interfere with the handling of surgical instruments and with the general surgical use of the gloves. The surface of the glove has a smooth, as opposed to slippery, feel and the smooth surface does not affect the handling of instruments. In fact, it has been discovered that as one grips an instrument more tightly with gloves having an outer coating according to the present invention, the instrument is more securely held. Thus, while the glove feels slippery when not in use, it has the property of readily holding instruments especially when finger pressure is exerted thereon. The Teflon acts like a non-slippery lubricant. Furthermore, the smooth Teflon surface is very non-adherent to body fluids, which facilitates washing and cleaning. This same property, in catheters, for example, prevents adhesion to the rubber article of blood or other body fluids or tissues, thus facilitating insertion or removal of the catheter or other rubber article. Also, of the greatest importance, during operative procedures, it is relatively common for the surgeon to blindly palpate the abdominal contents. It would be obvious that his glove should not stick to or drag on the viscera. It would also be required that the glove should not be so slippery that the palpation becomes faulty. As mentioned, the present non-slippery lubricant, Teflon, accomplishes this by the same mechanism that enables the surgeon to grasp and control his instruments without strain despite the reputation of Teflon of being exceedingly slippery.

If both glove surfaces are coated, all of the foregoing advantages will accrue and, in addition, the glove will not be "oriented," i.e., either surface could function as the outer surface. Suitable Teflon coatings have been provided on surgeon's surgical latex rubber gloves in accordance with the aforedescribed method, and other gloves, such as natural or synthetic latex gloves, neoprene rubber gloves or even plastics could be so coated. Similarly, application of Teflon coating on the inside and outside of other hollow tubular articles has given similar advantages to those observed with the rubber gloves. A urethral catheter thus coated has a sufficient lubricity on its outside surface to obviate the necessity for jellies (usually used). At the same time, the non-slippery lubricant effect does not interfere with the surgeon's control in insertion, manipulation or withdrawal. The catheter's inner and outer surface has the "non-sticky" property of Teflon which inhibits adhesion and facilitates cleaning. The results of coating the catheters would apply to all hollow tubes inserted within the body, e.g., intravenous or intra-arterial catheters, T tubes used for gall bladder drainage, and tracheostomy tubes.

When the opening of the body is of irregular geometry, it may be of advantage to insert "Penrose" rubber drains, which merely keep the drainage site open. In these cases a rubber dam is inserted which affords an irregular path from within to outside the body. Once again, the advantages of inside and outside coatings become apparent. The drain creates pathways out of the body. The pathway must be free of adhesion as in the geometrically defined tubes. Further, while in the body, they must not become adherent to surrounding tissue so that they may be removed with minimal trauma.

In the use of contraceptive devices which are continuously used, the advantages of coating all exposed surfaces with Teflon becomes apparent for the same rationale as previously described. It is important that the contraceptive device be easily handled, i.e., not too slippery, and that it be easily cleaned. Teflon coating of the surfaces would give the lubricating effect without being too slippery. At the same time, adhesion to body fluids as well as to adjacent tissues would be largely eliminated, thus facilitating insertion, removal and cleaning.

Continuous methods for coating the rubber articles are also applicable to the present invention. Suitable methods are described in detail in United States Patents 3,068,510 and 3,069,283 issued Dec. 18, 1962. These methods, which describe suitable apparatus for the continuous deposition of Teflon coatings on films, are suitable where the sheath article is temporarily flattened into planar configuration during the deposition step.

If the rubber article is of relatively complex configuration as in the case of a glove, air may be trapped between electrode 2 and the rubber article. To avoid this difficulty, an alternative electrode structure shown in FIG. 2 may be employed. The complex rubber structure, such as a glove 15, is secured by a clamp 18 to a metal collar 107 which collar is electrically connected to the power supply similarly as electrode 2 of FIG. 1. The glove is filled with metal shot 16 and the metal shot and collar 17 act as electrode 2 except that the shot conforms to the outline of the glove but does not permit entrapment of air. The collar may conveniently be copper and the shot a lightweight metal such as aluminum. The glove, of course, must be disposed "open end up." The shot may, of course, be spherical or granular.

I claim:
1. A surgeon's rubber glove having a continuous coating consisting essentially of polytetrafluoroethylene on substantially the entire outer surface thereof.
2. A surgeon's rubber glove having a continuous coating consisting essentially of polytetrafluoroethylene on substantially the entire inner surface thereof.
3. A surgeon's rubber glove having a continuous coating consisting essentially of polytetrafluoroethylene on substantially the entire inner and outer surfaces thereof.

References Cited

UNITED STATES PATENTS

| | | | |
|---|---|---|---|
| 2,772,444 | 12/1956 | Burrows et al. | 128—Teflon Digest |
| 2,814,296 | 11/1957 | Everett | 128—Teflon Digest |
| 2,992,957 | 7/1961 | Maxey | 161—Teflon Digest |
| 3,021,270 | 2/1962 | Tarbox et al. | 204—168 |
| 3,068,510 | 12/1962 | Coleman | 117—93 |
| 2,597,976 | 5/1952 | Cousins | 117—139 |
| 3,011,219 | 12/1961 | Williams. | |

FOREIGN PATENTS 801,479  9/1958  Great Britain _____ 117—93.31

ALFRED L. LEAVITT, Primary Examiner

J. H. NEWSOME, Assistant Examiner

U.S. Cl. X.R.

2—167; 117—93.1, 139, 161